United States Patent Office 3,530,388
Patented Sept. 22, 1970

3,530,388
LIGHT AMPLIFIER SYSTEM
Raymond Guerra, Glen Burnie, Gerald W. McElyea, Baltimore, John H. Cullom, Catonsville, and Gordon S. Ley, Arnold, Md., assignors to Westinghouse Electric Corporation, Pittsburgh, Pa., a corporation of Pennsylvania
Filed Apr. 21, 1965, Ser. No. 450,574
Int. Cl. H01s 3/02
U.S. Cl. 330—4.3                                11 Claims

ABSTRACT OF THE DISCLOSURE

A light beam is split into two parts each directed to travel substantially the same path but in opposite directions. Any disturbance altering the optical path of one part will similarly change the optical path of the other part. The resultant interferometer system can be used to amplify a light beam by placing active laser elements in at least some of the legs of the path followed by the aforementioned parts. Additional stages of amplification can be advantageously obtained by cascading stages of amplification.

---

The present invention relates generally to light amplifier systems and more particularly relates to a system for coherently amplifying the light output beam from a laser.

It is desirable to amplify a coherent light beam from a laser to obtain still higher power. Light amplifiers include the usual pump used in lasers and a rod of active material. When one or more amplifiers are aligned directly in the path of the beam, the energy density greatly increases as the beam progresses through the amplifier rod. The output end of the active material is of necessity driven harder than the input end which can result in internal fractures within the rod and failure of the system. Therefore, the beam may be divided into a plurality of parts each in turn amplified and recombined at the output of the system. In order to obtain recombination into a single beam the relative phase and amplitude of the parts being recombined must be closely controlled.

Interferometer assemblies have been used to split an incident laser beam into two separate paths where, after amplification, they are recombined by interference effect either at the same beam splitter or at another identical to the first. Many assemblies of the prior art suffered degradation of performance however by vibration varying the distance between the beam splitter and each of the mirrors. Another major cause of non-uniform path change is the variation in optical path length of each rod as it is pumped. A Michelson type interferometer, or for that matter any interferometer presenting different paths for each part of the split beam, presents the severe problem of insuring that the distance from the beam splitter to the mirror configuration is equal in each path. Separate paths for each part can also result in unequal amplification which upon recombination will be unable to fully cancel the parts of the beam directed in the undesired direction.

An object of the present invention is to provide a laser reflex amplifier system capable of cascading a large number of light amplifiers.

Another object of the present invention is to provide a laser amplifier system wherein the operation is insensitive to changes in optical path length of each individual laser.

Another object of the present invention is to provide a system for light amplification having a beam separating and recombining system wherein a close coupled relationship exists between the optical paths taken by each part of the beam.

Another object of the present invention is to provide a system for amplifying the output of a laser wherein the energy distribution over the length of the rod of active material in each light amplifier is more evenly distributed.

Another object of the present invention is to provide a coherent light amplifier system which has a vibrational stability heretofore unattainable.

Briefly, the present invention divides a light beam into two parts each directed over equal optical paths which are close coupled. Any disturbance which would change the optical path length of one part of the beam must also change the optical path length of the other part in an identical manner. At least one light amplifier is positioned to amplify each part of the light beam as it travels in opposite directions in optical paths of equal length. Hence, any refraction or phase shift of one part of the light beam due to variances in the mirrors or optical quality of the rods will similarly affect the other part of the light beam. By simple adjustment of the path lengths, the amplified beam upon recombination can be directed in a chosen direction by constructive interference. The recombined output will be a highly collimated beam.

These and other objects of the present invention will be more readily apparent from the following detailed description taken in conjunction with the drawing in which.

Figure 1:
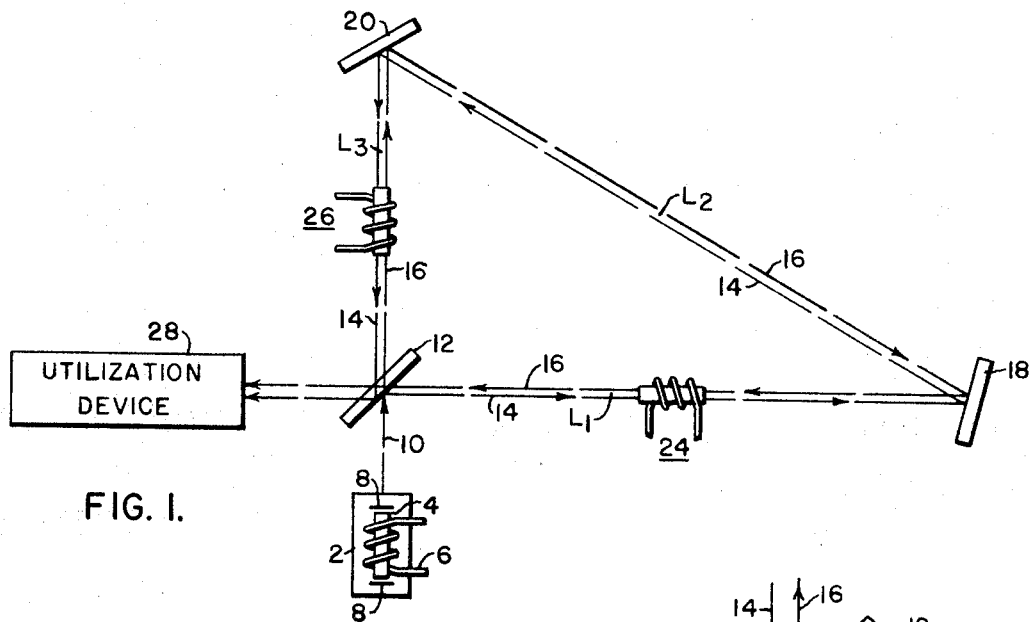
FIG. 1 is a schematic diagram of an illustrative embodiment of the present invention.

Referring to FIG. 1, a laser 2 including a rod 4 of active material is pumped by for example a light source 6. Two optically flat reflective surfaces 8, one being partially transparent, stimulate the emission of a coherent light beam 10.

A beam splitter 12 separates the beam 10 into two differently directed components or parts 14 and 16. Two reflecting devices, such as mirrors 18 and 20, establish a three-legged path for each component of light 14 and 16. For purposes of clarity, the initial direction of the light component 14 will hereinafter be referred to as the first leg with each subsequent direction of the light component 14 being referred to as the second and third leg respectively.

The mirror 18 terminates the first leg of the path of the light component 14 and redirects the component along the second leg to the second mirror 20. The second mirror 20 returns the light component 14 along the third leg to beam splitter 12. In a like manner the light component 16 passing through the beam splitter 12 travels the third leg until redirected by the mirror 20 to the mirror 18 via the second leg. The mirror 18 returns the light component 16 along the first leg to the beam splitter 12. The mirror arrangement aligns the paths taken by each light component to coincide although each component travels in a direction opposite to the other.

Light amplifiers 24 and 26 are illustrated positioned in the first leg and third leg of the optical paths. Each include a rod of active material and a pumping source. A light component entering an amplifier at either direction will be amplified as it progresses through the rod of active material within that amplifier. Since the original light beam 10 has been separated into two components 14 and 16, it can be seen that each component, traveling in different directions, enter at opposite ends of either amplifier with the result that the energy distribution within the rod of active material in either light amplifier is more uniform over the length of the rod. Accordingly, maximum utilization of the capabilities for amplification within each rod of the amplifiers 24 and 26 is attained. Should either amplifier refract or shift the phase of one component passing therethrough, the other component will be affected in a similar manner. Since the intensity of each part of light beam in the present invention is proportional to the product of the reflectances of the mirrors 18 and 20 as well as the beam splitter 12 it is not necessary that the reflectances be ekual.

Figure 2:
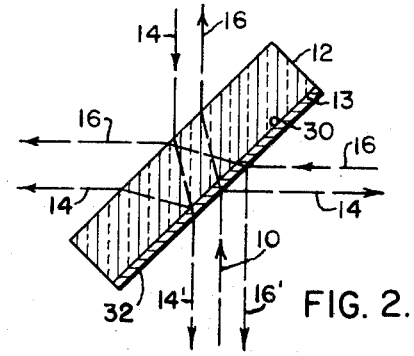
FIG. 2 is an enlarged view of the optical paths taken by a light beam through an element utilized in the illustrative embodiment of FIG. 1.

FIG. 2 more particularly illustrates the path taken by the coherent light beam 10 through the beam splitter 12. The beam splitter 12 may be of any suitable type such as a mirror having a lightly deposited metallic coating 13 that transmits a portion of the input incident light 10, such as the component 16, and reflects the remainder, namely, the component 14. Each light component or part after being amplified, is reflected once more by the beam splitter 12 thereby recombining on the output side 30 of the beam splitter the components 14 and 16 in a direction towards a target or other utilization device 28. Another portion of the amplified light passes through the reflecting surface 13 of the beam splitter 12 in a direction from the output side 32 as indicated by the arrows on the dotted lines 14′ and 16′. If the two circulating parts 14 and 16 are phased properly at the beam splitter 12, the recombined beam can be made to exit the interferometer system by either or both of the output sides 30 and 32.

If the path of each part 14 and 16 when measured from and to the input side of the beam splitter 12 is identical, then each component of the beam 10 experiences identical path conditions and the parts will be in phase again on the input side of the splitter. Since the intensity, I, of the beam is equal to the square of the amplitude, A, the amplitude, $a$, of each part of the output beams will be $$a = \sqrt{\frac{I_o}{4}}$$

Because the two portions 14′ and 16′ comprising the output from side 30 are in phase the recombined beam exiting from 30 will have an intensity I equal to $4a^2$. Substituting for $a$, $$I_o = 4 \left( \sqrt{\frac{I_o}{4}} \right)^2$$

Figure 3:
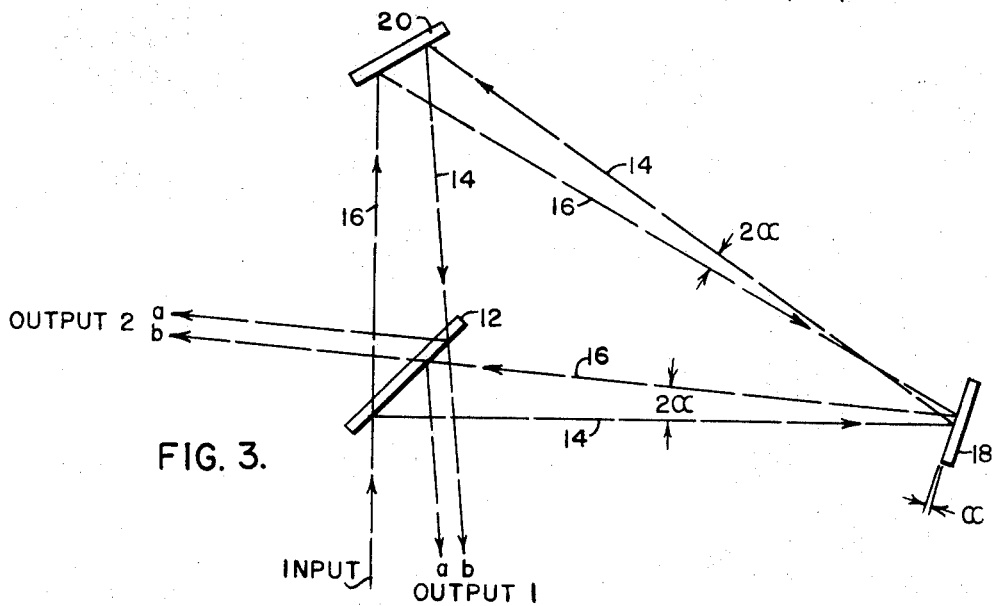
FIG. 3 is a schematic diagram illustrating the manner in which the present invention obtains the desired results.

Hence all the incident energy exits via output side 32. The recombined parts 14 and 16 exiting from output side 30 must be 180° out of phase and cancel completely. It is desirable however to exit the recombined beam from the side 30 of the splitter 12 rather than the side 32 which is also the input side. Hence, adjustment of the two parts exiting from side 30 are adjusted to be in phase. This can be done in accordance with the present invention, by rotating either one of the mirrors or the beam splitter. In FIG. 3, mirror 18 has been rotated through an angle $\alpha$. The output from the interferometer system is illustrated exiting from both sides 30 and 32.

Figure 4:
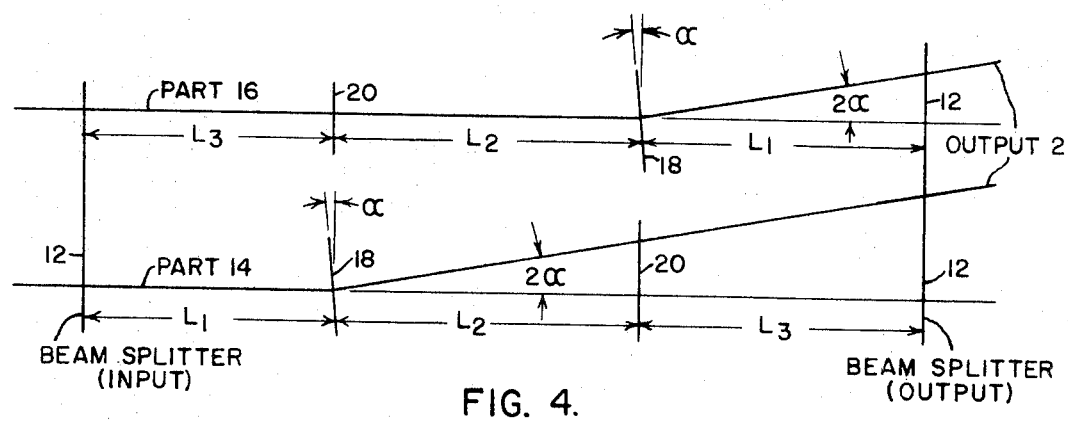
FIG. 4 is a graphical representation of the variation of path lengths involved in the diagrammatic system of FIG. 3.

The effect is illustrated in FIG. 4 when the difference in paths lengths can be seen $$\Delta L = [L_3 + L_2 + L_1 \cos 2\alpha] - [L_1 + (L_2 + L_3) \cos 2\alpha]$$

or $$\Delta L = (L_3 + L_2)(1 - \cos 2\alpha) - (L_1)(1 - \cos 2\alpha)$$
$$= (1 - \cos 2\alpha)(L_3 + L_2 - L_1)$$

Or to simplify if leg $L_1$ equal leg $L_3$ $$\Delta L = L_2 (1 - \cos 2\alpha)$$

Therefore by adusting the angle $\alpha$ so that $\Delta L = \lambda/2$ the parts 14 and 16 will be in place and the recombined amplified beam will exit from the output side 30. Such alignment can be confirmed by means of measuring the fringe patterns of the output. A comparison of a pattern recorded on photographic film 28 in FIG. 1 with the well known Frunhoffer diffraction pattern will indicate the degree of spatial coherence. Phase coherence can also be measured by comparing the intensity of the beam with that predicted by diffraction theory.

Figure 5:
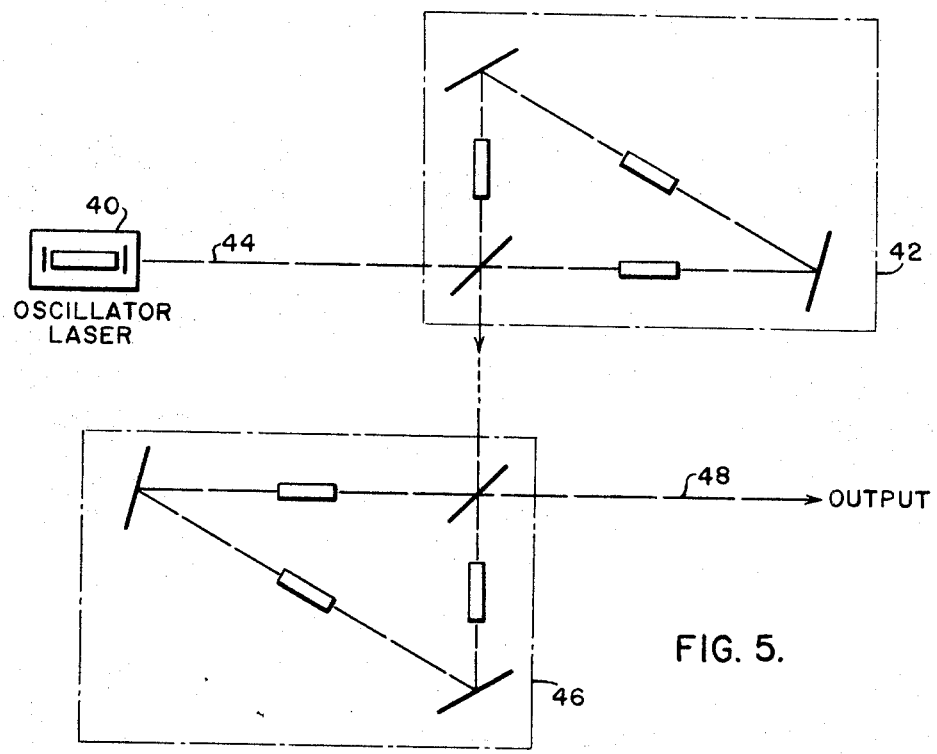
FIG. 5 is a schematic diagram of another illustrative embodiment of the present invention.

A number of amplifier systems may be cascaded as in FIG. 5 to further increase the intensity of a laser 40. The first system 42 receives the beam 44, divides it into two parts and recombines the amplified parts in phase from where it is directed to another system 46. The amplified output beam 48 is then directed to another stage or to a target or utilization device. Of course the beam 48 when desired can be divided into separate parts to be individually amplified and recombined by other beam splitters. This would allow the attainment of power levels substantially in excess of the limitations of any single rod.

Thus, it is readily apparent that in the present invention, two beam components are separated and amplified while maintaining the phase relationship of the beam for recombination to obtain maximum intensity output from the system. Any disturbance within the system which would change the optical path length of one beam component must also change the optical path of the other beam component in an identical manner. This permits a less stringent environmental limitation, especially in vibration aspects.

Although the present invention has been described with a degree of particularity for the purposes of illustration, it is to be understood that all modifications, substitutions and alterations within the spirit and scope of the present invention are herein meant to be included. For example, while the reflecting elements 18 and 20 have been referred to as mirrors, it is to be understood that any flat optically ground and polished surface on a reflecting material or a transparent material that is coated to make it reflecting, may be used for redirecting the light to another leg of the optical path each beam component travels. Assuming each light amplifier to have the same capabilities, the beam splitter 12 would advantageously be selected to transmit 50% of the incident light and reflect the remainder. However, if the reflectance of either mirror or the refracting index of either light amplifier has non-linearities in their amplifying characteristics, the beam splitter 12 may be selected to separate the beam 10 into any desired proportion such as 60–40%. Although the active material of each amplifier has been referred to as a rod, other active materials such as gases or liquids may be utilized. It is to be noted that while the present system finds utilization in the amplification of a coherent light beam, it has other aspects of utilization for comparing the phase relationship between each half of any light beam which is split by studying the fringe patterns of the recombined light beam as, for instance, in an interferometer application.

We claim as our invention:

1. A system for amplifying a coherent light beam comprising, in combination; means for splitting said beam into two differently directed parts; means located in the direction of each part for redirecting that part via the means for redirecting the other part to return said parts to said separating means; and light amplifier means positioned in the path of said parts for amplifying the light passing therethrough.

2. A system for coherently amplifying the output beam of a laser comprising, in combination; a beam splitter; two reflecting mirrors; said beam splitter separating said beam into two differently directed parts; one of said mirrors positioned in the path of one part of said beam while the other mirror positioned in the path of the other part of said beam; each mirror redirecting the part received directly from said beam splitter to the beam splitter via the other mirror; and means located in the path of each part for amplifying each part passing therethrough.

3. A system for amplifying a coherent light beam comprising, in combination; a beam splitter for separating said beam into two differently directed parts; two mirrors each located to redirect one part of said beam from said beam splitter to the other mirror and to return the other part of said beam from the other mirror to said beam splitter; means located in the path of each part of the beam for amplifying each part; and means for adjusting the difference in length each part follows to place both parts in phase at the beam splitter.

4. A system for amplifying a coherent light beam comprising, in combination; a beam splitter for separating said beam into two differently directed parts; a first mirror and a second mirror; said first mirror terminating a first leg of the path for one of said parts and redirecting said part along a second leg to said second mirror; said second mirror returning said one part along a third leg to said beam splitter; said second mirror receiving the other part of said light beam along said third leg and redirecting it along said second leg to said first mirror; said first mirror returning said other part along said first leg to the beam splitter; and means located in at least one leg of the path for amplifying each part of said light beam as it travels said leg.

5. A system for amplifying a coherent light beam comprising, in combination; a beam splitter for separating said beam into two parts; a first, second and third legged path for each part of said light beam; a first mirror connecting the first and second legs; a second mirror connecting the second and third legs; said first mirror redirecting a part of said beam to said second mirror; said second mirror redirecting the other part of said beam to said first mirror; said first and second mirrors each returning the part received from the other mirror along a respective third leg to said beam splitter; and means located in at least one of said legs for amplifying parts passing along a given leg.

6. The system of claim 5 wherein said beam splitter divides the output beam into two equal parts.

7. The system of claim 5 wherein said beam splitter divides the laser beam into two paths perpendicular to each other.

8. A system for dividing a light beam into two parts, each directed over equal optical paths, comprising, in combination; means for separating said beam into two differently directed parts; means located in the direction of each part for reflecting that part via the means for reflecting the other part to return said parts to said means for separating; and means for determining the relative phase of each part of said light beam returning to said separating means.

9. In combination, a laser for providing a coherent light beam; a beam splitter for separating said beam into two differently directed parts; a first mirror and a second mirror; said first mirror terminating a first leg of the path of one of said parts and redirecting said part along a second leg to said second mirror; said second mirror returning said one of said parts along a third leg to said beam splitter; said second mirror receiving the other part of said light beam along said third leg redirecting it along said second leg to said first mirror; said first mirror returning said other part along said first leg to said beam splitter; and a light amplifier including an active material and means for pumping said material, located in at least one leg of the path for amplifying each part of said light beam as it travels said leg.

10. A system for amplifying a coherent light beam comprising, in combination; a beam splitter having two output sides, one of which being also the input side for receiving the beam to be split; said beam splitter separating said beam into two differently directed parts; two reflecting means; one of said reflecting means positioned in the path of one part of said beam while the other reflecting means is positioned in the path of the other part of said beam; each reflecting means redirecting the part received directly from said beam splitter to the beam splitter via the other reflecting means; means for adjusting the phase of each part to exit the recombined beam from a predetermined side of said beam splitter; and means located in the path of each part of the beam for amplifying each part.

11. In combination, a cascaded plurality of coherent light amplifier systems; each system including a beam splitter for separating the beam to be amplified into two differently directed parts, a mirror located in the direction of each part for redirecting that part via the mirror for redirecting the other part to return both parts to the beam splitter, and light amplifier means interposed in the path of each part of the beam for amplifying each part entering at opposite ends of the light amplifier means; a laser having a coherent light beam output directed to the beam splitter of a first of said cascaded plurality of amplifier systems; each subsequent amplifier system receiving the recombined amplified beam output from its preceeding amplifier system; the last amplifier system having an output directed to a utilization device.

References Cited

UNITED STATES PATENTS 3,320,850   5/1967   Oliver.

RODNEY D. BENNETT, Primary Examiner

D. C. KAUFMAN, Assistant Examiner

U.S. Cl. X.R.

331—94.5; 350—171